US012282291B2

(12) United States Patent
Shimamoto

(10) Patent No.: US 12,282,291 B2
(45) Date of Patent: Apr. 22, 2025

(54) IMAGE FORMING APPARATUS

(71) Applicant: CANON KABUSHIKI KAISHA, Tokyo (JP)

(72) Inventor: Yuri Shimamoto, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/504,358

(22) Filed: Nov. 8, 2023

(65) Prior Publication Data

US 2024/0160148 A1 May 16, 2024

(30) Foreign Application Priority Data

Nov. 15, 2022 (JP) ................................. 2022-182675

(51) Int. Cl.
*G03G 21/20* (2006.01)
*G03G 15/16* (2006.01)

(52) U.S. Cl.
CPC ......... *G03G 21/206* (2013.01); *G03G 15/161* (2013.01)

(58) Field of Classification Search
CPC ........................... G03G 21/206; G03G 15/161
See application file for complete search history.

(56) References Cited

U.S. PATENT DOCUMENTS 6,144,831 A * 11/2000 Takenouchi ....... G03G 15/6535 399/302
7,233,762 B2 * 6/2007 Kunii .................. G03G 15/169 399/307
9,201,395 B2 12/2015 Uchida et al.

FOREIGN PATENT DOCUMENTS

JP 2015028563 A 2/2015

* cited by examiner

*Primary Examiner* — Stephanie E Bloss
*Assistant Examiner* — Michael A Harrison
(74) *Attorney, Agent, or Firm* — ROSSI, KIMMS & McDOWELL LLP

(57) ABSTRACT

A distance between a fan and an area of a belt opposed to the fan at a downstream side in an air discharge direction of the fan is a first distance. A distance between the fan and an area of the belt opposed to the fan at an upstream side in an air intake direction of the fan is a second distance. The first distance is equal to or greater than the second distance.

9 Claims, 6 Drawing Sheets

IMAGE FORMING APPARATUS

BACKGROUND OF THE INVENTION

Field of the Invention

The present invention relates to image forming apparatuses such as a copying machine, a printer, a facsimile, or a multifunction apparatus having a plurality of such functions,

Description of the Related Art

Hitherto, an image forming apparatus is known to have a configuration in which a toner image is primarily transferred from a photosensitive drum to an intermediate transfer belt at a primary transfer portion, and thereafter, the toner image is secondarily transferred from the intermediate transfer belt to a recording material at a secondary transfer portion. The toner image transferred to the recording material is heated by a fixing unit and fixed to the recording material. According to this configuration, the intermediate transfer belt may be heated by the recording material having passed through the fixing unit being passed through the secondary transfer portion, or heated by radiant heat from the fixing unit.

If the intermediate transfer belt is heated, toner on the intermediate transfer belt may be melted and fixed to the intermediate transfer belt. Further, the heat may be transferred from the intermediate transfer belt to the photosensitive drum, causing overheating of image forming units including photosensitive drums and developing devices.

In order to cope with this situation, a configuration for cooling the intermediate transfer belt has been proposed (Japanese Patent Application Laid-Open Publication No. 2015-28563). In Japanese Patent Application Laid-Open Publication No. 2015-28563, a cooling fan is disposed outside the intermediate transfer belt to generate an airflow toward an outer circumference surface of the belt, that is, to the surface on which toner is applied.

However, in a configuration as disclosed in Japanese Patent Application Laid-Open Publication No. 2015-28563 in which air is blown toward the surface of the intermediate transfer belt from the outer side of the intermediate transfer belt, the toner on the surface of the belt may be scattered, and the interior of the image forming apparatus body may be soiled.

SUMMARY OF THE INVENTION

The present invention provides a configuration for efficiently suppressing the rising of temperature of the belt without scattering the toner on the surface of the belt.

According to one aspect of the present invention, an image forming apparatus includes a rotatable endless belt configured to bear a toner image on an outer circumference surface of the belt, a plurality of stretching members configured to stretch the belt, a frame configured to support the stretching members, a transfer member to which a transfer voltage is applied and that is configured to transfer the toner image borne on the belt to a recording material, a voltage applied portion arranged on an inner side of the belt and configured to receive application of a voltage to generate the transfer voltage, and, a fan supported on the frame, arranged on the inner side of the belt, and configured to cool the voltage applied portion. A distance between the fan and an area of the belt opposed to the fan at a downstream side in an air discharge direction of the fan is a first distance. A distance between the fan and an area of the belt opposed to the fan at an upstream side in an air intake direction of the fan is a second distance. The first distance is equal to or greater than the second distance.

Further features of the present invention will become apparent from the following description of exemplary embodiments with reference to the attached drawings.

DESCRIPTION OF THE EMBODIMENTS

First Embodiment

Figure 1:
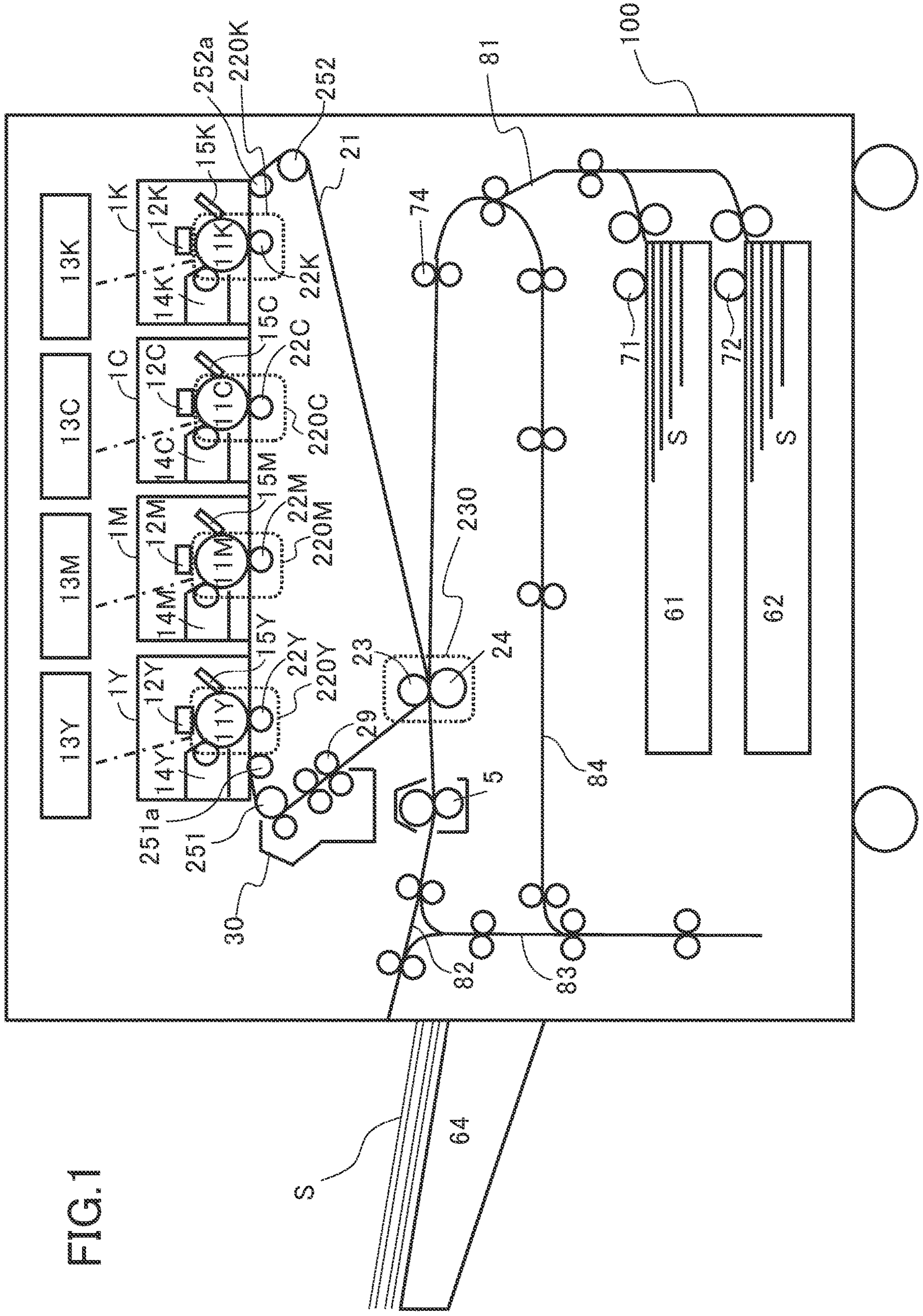
FIG. 1 is a schematic cross-sectional view of an image forming apparatus according to a first embodiment.

A first embodiment will be described with reference to FIGS. 1 and 2. At first, a general configuration of an image forming apparatus according to a present embodiment will be described with reference to FIG. 1.

Image Forming Apparatus

An image forming apparatus 100 is a tandem intermediate transfer-type image forming apparatus in which image forming units 1Y, 1M, 1C, and 1K are arranged in series along a horizontal portion of an intermediate transfer belt 21. The image forming apparatus 100 forms a full-color image on a recording material S such as a sheet, i.e., a sheet of paper or an OHP sheet, by an electrophotographic system based on an image signal transmitted from an external apparatus such as a personal computer or an image signal from a document reader. The order in which the image forming units described above are arranged is merely an example, such that the positions thereof are not limited to those described above, and even further, the number of image forming units are not limited to the above-mentioned number.

The image forming units 1Y, 1M, 1C, and 1K form toner images of respective colors of yellow, magenta, cyan, and black on photosensitive drums 11Y, 11M, 11C, and 11K serving as image bearing members, and primarily transfers the toner images to a same image position on the intermediate transfer belt 21. A surface of the photosensitive drum 11Y is charged uniformly by a charging unit 12Y. An exposing unit 13Y irradiates the charged photosensitive drum 11Y with light and forms a latent image on a surface thereof. A developing unit 14Y transfers yellow toner on the latent image formed on the photosensitive drum 11Y and forms a yellow toner image. The yellow toner image formed on the photosensitive drum 11Y is primarily transferred to the intermediate transfer belt 21 by having a primary transfer bias applied to a primary transfer roller 35Y. Toner remaining on the photosensitive drum 11Y after primary transfer of the toner image is removed by a cleaning member 15Y.

The toner images of magenta, cyan, and black are formed on the respective photosensitive drums 11M, 11C, and 11K in the image forming units 1M, 1C, and 1K, similarly as the image forming unit 1Y. Each toner image is transferred to be superposed on the yellow toner image on the intermediate transfer belt 21, and a full-color toner image is formed on the intermediate transfer belt 21. The configurations of the respective units of the image forming units 1M, 1C, and 1K are illustrated with a suffix M, C, and K, respectively replacing "Y" attached to the reference numbers of the configuration illustrated in the image forming unit 1Y, and descriptions thereof are omitted.

The intermediate transfer belt 21 serving as an endless belt is stretched across a plurality of stretch rollers including a first roller 251, a second roller 252, and a secondary transfer inner roller 23 serving as a plurality of stretching members, and the intermediate transfer belt 21 is rotatable by having drive entered to any one of these rollers. The primary transfer rollers 22Y, 22M, 22C, and 22K serving as primary transfer members are arranged at positions opposed to the photosensitive drums 11Y, 11M, 11C, and 11K with the intermediate transfer belt 21 interposed therebetween, by which primary transfer portions 220Y, 220M, 220C, and 220K are formed. By having a primary transfer voltage applied to the primary transfer rollers 22Y, 22M, 22C, and 22K, the toner images formed on the photosensitive drums 11Y, 11M, 11C, and 11K are primarily transferred to the intermediate transfer belt 21.

A secondary transfer outer roller 24 serving as a secondary transfer member is arranged at a position abutting against the secondary transfer inner roller 23 with the intermediate transfer belt 21 interposed therebetween, and a secondary transfer portion 230 is formed thereby. The toner image on the intermediate transfer belt 21 is secondarily transferred to the recording material S by having a secondary transfer voltage applied to either the secondary transfer inner roller 23 or the secondary transfer outer roller 24. Transfer residual toner and unnecessary toner image that remain on the intermediate transfer belt 21 after secondary transfer is removed by a cleaning apparatus 30.

The image forming apparatus 100 includes a plurality of sheet feed cassettes 61 and 62 that store the recording materials S. The recording material S stored in the respective cassettes is conveyed to a recording material conveyance path 81 by rotation of either one of feed rollers 71 and 72, and reaches a registration roller 74. The registration roller 74 feeds the recording material S to the secondary transfer portion 230 at a matched timing with the toner image on the intermediate transfer belt 21. Then, the toner image on the intermediate transfer belt 21 is transferred to the recording material S at the secondary transfer portion 230.

Next, the recording material S having the toner image transferred thereto is conveyed to a fixing unit 5 arranged downstream of the secondary transfer portion 230 in a conveyance direction of the recording material, and the recording material S is heated and pressed at the fixing unit 5 to have a full-color toner image fixed to a surface thereof. Thereafter, the recording material S having the toner image fixed thereto is passed through a sheet discharge conveyance path 82 and discharged onto a sheet discharge tray 64. In the case of duplex printing, the direction of the recording material S is reversed in a reverse conveyance path 83, and passed through the duplex conveyance path 84 to be conveyed again to the secondary transfer portion 230, where a toner image is transferred to the recording material S. Thereafter, the recording material S is conveyed to the fixing unit 5 where the toner image is fixed thereto, and the recording material S is passed through the sheet discharge conveyance path 82 to be discharged onto the sheet discharge tray 64.

The position and number of sheet feed cassettes illustrated in FIG. 1 are merely an example, and the present technique is not limited to the position and number being illustrated. Further, in FIG. 1, the recording material S being fed is conveyed from right to left, but the direction is not limited thereto, and the recording material S may be conveyed from left to right.

Configuration of Intermediate Transfer Apparatus

Next, with reference to FIG. 2, an intermediate transfer apparatus 20 including the intermediate transfer belt 21 will be described. The intermediate transfer apparatus 20 includes the intermediate transfer belt 21, a plurality of stretch rollers including the first roller 251, the second roller 252, and the secondary transfer inner roller 23, the primary transfer rollers 22Y, 22M, 22C, and 22K, and a frame 26 that supports the respective rollers. The frame 26 includes one pair of side plates not shown that are disposed on both end sides of the intermediate transfer belt 21 with respect to a rotational axis direction of the respective rollers, that is, a width direction intersecting a direction of rotation of the intermediate transfer belt 21, and a first connecting portion 261 and a second connecting portion 262 that connect the pair of side plates together. Both end portions of the respective rollers described above are supported rotatably by the pair of side plates.

When performing duplex printing in the image forming apparatus 100, the recording material S having passed through the fixing unit 5 once and heated thereby is conveyed to the secondary transfer portion 230, such that the intermediate transfer belt 21 is heated by the heat of the recording material S at the secondary transfer portion 230. Further, in many cases, in order to downsize the apparatus, the fixing unit 5 is arranged in a vicinity of a downstream side of the secondary transfer portion 230 in the conveyance direction of the recording material S. In that case, the intermediate transfer belt 21 is also heated by a radiant heat of the fixing unit 5. As described, in the intermediate transfer belt 21, a third surface 213 described later, which is a portion downstream of the secondary transfer portion 230 in a direction of rotation of the intermediate transfer belt 21, tends to be heated to a high temperature compared to other areas.

The first roller 251 and the second roller 252 are included in the stretch rollers. The first roller 251 is positioned upstream of the primary transfer roller 22Y that is positioned most upstream among the plurality of primary transfer rollers 22Y, 22M, 22C, and 22K. The second roller 252 is positioned downstream of a primary transfer roller 22K that is positioned most downstream among the primary transfer rollers. The first roller 251 and the second roller 252 are arranged such that a winding angle of the intermediate transfer belt 21 is made greater than the other stretch rollers. In the configuration illustrated in FIG. 1, a roller 251*a* is arranged between the primary transfer roller 22Y and the first roller 251, but the roller 251*a* may be omitted, as illustrated in FIG. 2. Further, as illustrated in FIGS. 1 and 2, a roller 252*a* is arranged between the primary transfer roller 22K and the second roller 252, but the roller 252*a* nay also be omitted.

The plurality of primary transfer rollers 22Y, 22M, 22C, and 22K are aligned linearly along a direction of rotation of the intermediate transfer belt 21, and this direction of alignment is referred to as a first direction. That is, according to the configuration illustrated in FIG. 1, a direction parallel to a stretched surface stretched by the roller 251*a* and the roller 252*a* in the outer circumference surface of the intermediate transfer belt 21, and according to the configuration illustrated in FIG. 2, a direction parallel to a stretched surface stretched by the first roller 251 and the roller 252*a* in the outer circumference surface of the intermediate transfer belt 21, is referred to as the first direction. Toner image is transferred from each of the photosensitive drums 11Y, 11M, 11C, and 11K to a stretched surface 21*a* of the intermediate transfer belt 21 along the first direction. In the present embodiment, the first direction is an approximately horizontal direction.

Further, in the outer circumference surface of the intermediate transfer belt 21, an area arranged between the primary transfer roller 22Y arranged most upstream and the primary transfer roller 22K arranged most downstream in the direction of rotation of the intermediate transfer belt 21 is referred to as a first surface 211. The first surface 211 includes the stretched surface 21*a* described above. Further, in the intermediate transfer belt 21, an area arranged between the second roller 252 and the secondary transfer inner roller 23 is referred to as a second surface 212, and an area arranged between the secondary transfer inner roller 23 and the first roller 251 is referred to as a third surface 213. Each of the surfaces may not be a flat surface due to the presence of another roller between the rollers stretching the surface.

In the present embodiment, a cooling fan 27 serving as a fan for generating airflow is arranged on an inner side of the intermediate transfer belt 21 to cool the third surface 213 of the intermediate transfer belt 21 from an inner circumference side of the intermediate transfer belt 21, that is, from a side opposite to the side on which the toner image is formed. The cooling fan 27 is an axial fan supported on the frame 26, and in the present embodiment, the cooling fan 27 generates air flowing approximately in parallel with the first direction. The cooling fan 27 is the axial fan, and the direction of airflow generated by the cooling fan 27 is the rotational axis direction of the cooling fan 27.

The cooling fan 27 is arranged such that, regarding the direction of airflow generated by the cooling fan 27, i.e., rotational axis direction of the cooling fan 27, a distance, i.e., first distance, A between an area of the intermediate transfer belt 21 opposed to an air discharge port 27*a* of the cooling fan 27 at a downstream side in the air discharge direction, that is, an inner circumference surface 212*a*, and the air discharge port 27*a* is equal to or longer than a distance i.e., second distance, B between an area of the intermediate transfer belt 21 opposed to an air intake port 27*b* of the cooling fan 27 at an upstream side in the air intake direction, that is, an inner circumference surface 213*a*, and the air intake port 27*b* (A≥B).

Specifically, according to the present embodiment, the cooling fan 27 is arranged such that, regarding the direction of airflow, the distance A between the inner circumference surface 212*a* of the intermediate transfer belt 21 opposed to the air discharge port 27*a* and the air discharge port 27*a* is longer than the distance B between the inner circumference surface 213*a* of the intermediate transfer belt 21 opposed to the air intake port 27*b* and the air intake port 27*b* (A>B).

The inner circumference surface 212*a* of the intermediate transfer belt 21 opposed to the air discharge port 27*a* is the inner circumference surface of the intermediate transfer belt 21 whose outer circumference surface serves as the second surface 212, and the inner circumference surface 213*a* of the intermediate transfer belt 21 opposed to the air intake port 27*b* is the inner circumference surface of the intermediate transfer belt 21 whose outer circumference surface serves as the third surface 213. In other words, the inner circumference surface 213*a* of the intermediate transfer belt 21 opposed to the air intake port 27*b* is an area downstream of the secondary transfer portion 230 and upstream of a primary transfer portion 220Y with respect to the direction of rotation of the intermediate transfer belt 21. Therefore, the cooling fan 27 is arranged close to the inner circumference surface side of the third surface 213, so as to take in air from the inner circumference surface of the third surface 213 and discharge air to a wider space within the intermediate transfer apparatus 20.

The distance between the air discharge port 27*a* and the inner circumference surface 212*a* is set to be a distance between a center position of an opening surface of the cooling fan 27 on which the air discharge port 27*a* is formed, i.e., air discharge surface, and a position where a line extended downstream in the air discharge direction along the rotational axis direction of the cooling fan 27 from the center position intersects the inner circumference surface 212*a*. Similarly, the distance between the air intake port 27*b* and the inner circumference surface 213*a* is set to be a distance between a center position of an opening surface of the cooling fan 27 on which the air intake port 27*b* is formed, i.e., air intake surface, and a position where a line extended upstream in the air intake direction along the rotational axis direction of the cooling fan 27 from the center position intersects the inner circumference surface 213*a*.

As described, the reason why air is taken in by the cooling fan 27 from a narrow space and discharged to a wide space is because the efficiency of ventilation is better than blowing air into a narrow space. In other words, ventilation inside the intermediate transfer apparatus 20 is promoted by setting the space toward which air is blown out by the cooling fan 27 to be wider than the space from which air is taken in. Even in a case where the distance A between the air discharge port 27*a* and the inner circumference surface 212*a* is equal to the distance B between the air intake port 27*b* and the inner circumference surface 213*a*, the ventilation on the inner side of the intermediate transfer belt 21 is promoted, such that the distance A and the distance B may be set equal. However, the ventilation on the inner side of the intermediate transfer belt 21 is promoted by setting the distance A to be greater than the distance B, such that it is preferable to arrange the cooling fan 27 so that the distance A is longer than the distance B.

On the air discharge side of the cooling fan 27, the air discharge port 27*a* of the cooling fan 27 is communicated with the inner circumference surface 212*a* of the intermediate transfer belt 21 opposed to the air discharge port 27*a* so as to prevent heat from being accumulated. As described above, the frame 26 includes the first connecting portion 261 and the second connecting portion 262. The first connecting portion 261 and the second connecting portion 262 are arranged along the rotational axis direction of the respective stretch rollers in a manner connecting the pair of side plates. The first connecting portion 261 is arranged to extend approximately parallel to the first direction below the primary transfer rollers 22Y to 22K, and the second connecting portion 262 is arranged to extend approximately parallel to the first connecting portion 261 below the first connecting portion 261. According to the present embodiment, the cooling fan 27 is attached to the second connecting portion 262. Specifically, the cooling fan 27 is supported on an upper surface of the second connecting portion 262 between the first connecting portion 261 and the second connecting portion 262.

A bent portion 263 is formed on the second connecting portion 262 to enhance strength. Possible configurations of the bent portion 263 include a configuration that is integrated with the second connecting portion 262 and that extends in an angle, such as an orthogonal angle, with respect to the first direction and the rotational axis direction of the stretch roller, as illustrated in FIG. 2, and a configuration as a pipe that extends in the rotational axis direction. In the former case, a configuration may be adopted where the first connecting portion 261 and the second connecting portion 262 are not connected, or a configuration may be adopted where the first connecting portion 261 and the second connecting portion 262 are connected but with an opening or a louver formed on the bent portion 263.

Thereby, the space between the first connecting portion 261 and the second connecting portion 262 may be communicated with the space between the first connecting portion 261 and the intermediate transfer belt 21. That is, the air discharge port 27*a* of the cooling fan 27 may be communicated with the inner circumference surface 212*a* of the intermediate transfer belt 21 opposed to the air discharge port 27*a*. Further, even in the latter configuration where the second connecting portion 262 is reinforced with a reinforcing member such as a pipe, the space between the first connecting portion 261 and the second connecting portion 262 may be communicated with the space between the first connecting portion 261 and the intermediate transfer belt 21 through the gap of the reinforcing member.

Further, the one pair of side plates of the frame 26 and the intermediate transfer belt 21 are not in contact with each other, such that a gap is formed between the one pair of side plates and the intermediate transfer belt 21. Therefore, an interior space surrounded by the one pair of side plates and the intermediate transfer belt 21 is communicated through this gap with the exterior space of the intermediate transfer belt 21. Further, an opening portion may further be formed on the one pair of side plates, and the interior space surrounded by the one pair of side plates and the intermediate transfer belt 21 may be communicated through this opening portion with the exterior space of the intermediate transfer belt 21.

Further, a cooling roller 29 may be arranged to be in contact with the inner circumference surface 213*a* of the intermediate transfer belt 21 opposed to the air intake port 27*b* of the cooling fan 27. The cooling roller 29 is a metallic roller having a high thermal conductivity, such as an aluminum pipe. The third surface 213 may be cooled more efficiently by arranging the cooling roller 29 on the inner circumference surface 213*a*.

Further, for example, if a heating element 28 such as a high-voltage substrate serving as a voltage applied portion for applying secondary transfer voltage or a resistor electrically connected to the high-voltage substrate is arranged within the intermediate transfer apparatus 20, it is preferably arranged either between the inner circumference surface 213*a* of the intermediate transfer belt 21 and the air intake port 27*b* of the cooling fan 27 or between the air discharge port 27*a* of the cooling fan 27 and the inner circumference surface 212*a* of the intermediate transfer belt 21. According to the present embodiment, the heating element 28 is a voltage applied portion to which voltage for generating a secondary transfer voltage is applied. The voltage applied portion may be the high-voltage substrate alone, or may include a resistor that is electrically connected to the high-voltage substrate. For example, as illustrated in FIG. 2, the heating element 28 is supported on the second connecting portion 262 of the frame 26 and arranged in a vicinity of the air intake port 27*b*. Even in a case where the heating element 28 is arranged on the air discharge port 27*a* side, the heating element 28 is preferably arranged in a vicinity of the air discharge port 27*a*. Thereby, the heating element 28 may be cooled efficiently. That is, as described later, in a case where the heating element 28 is arranged on the air discharge port 27*a* side (FIG. 4), the heating element 28 is arranged in a vicinity of the air discharge port 27*a* such that the distance between the heating element 28 and the air discharge port 27*a* is made shorter compared to the distance between the intermediate transfer belt 21 and the heating element 28 in the air discharge direction of the cooling fan 27. Further, a cooling duct not shown to be connected with the cooling fan 27 may be disposed to send air in a concentrated manner to the heating element 28.

As described, according to the present invention, the rising of temperature of the intermediate transfer belt 21 may be suppressed without causing scattering of toner on the surface of the intermediate transfer belt 21. That is, since the cooling fan 27 is arranged on the inner side of the intermediate transfer belt 21, scattering of toner on the outer circumference surface of the intermediate transfer belt 21 by the airflow generated by the cooling fan 27 may be suppressed. Moreover, since the distance A between the air discharge port 27*a* of the cooling fan 27 and the inner circumference surface 212*a* of the intermediate transfer belt 21 is set equal to or longer than the distance B between the air intake port 27*b* and the inner circumference surface 213*a*, or preferably, the distance A is set longer than the distance B, the intermediate transfer belt 21 may be cooled efficiently.

Since the space surrounded by the air discharge port 27*a* of the cooling fan 27, the first connecting portion 261, the second connecting portion 262, and the inner circumference surface 212*a* is greater than the space surrounded by the air intake port 27*b* of the cooling fan 27, the first connecting portion 261, the second connecting portion 262, and the inner circumference surface 213*a* of the third surface 213, the heat of the third surface 213 that has a relatively high temperature may be discharged by the cooling fan 27 to a relatively wide space, such that the interior of the intermediate transfer apparatus 20 may be ventilated efficiently. Thereby, the temperature gradient within the intermediate transfer apparatus 20 may be leveled, and the overheating of the intermediate transfer belt 21, the photosensitive drums 11Y to 11K, and the developing units 14Y to 14K may be prevented.

Moreover, according to the present embodiment, the secondary transfer inner roller 23 is arranged upstream in the direction of rotation of the intermediate transfer belt 21 with respect to a center position of the intermediate transfer belt 21 in the first direction. Specifically, the secondary transfer inner roller 23 is arranged in a vicinity of the area opposed to the primary transfer roller 22Y in FIG. 2, that is, between the primary transfer roller 22Y and a primary transfer roller 22M in the first direction. Thereby, the space below the first connecting portion 261 is greater in the area upstream in the direction of rotation of the intermediate transfer belt 21 in the first direction than the area downstream thereof. According thereto, the second connecting portion 262 may easily be arranged close to the upstream side in the direction of rotation of the intermediate transfer belt 21 in the first direction with respect to the first connecting portion 261, such that the inner circumference surface 213*a* of the third surface 213 and the opening surface of the air intake port 27*b* of the cooling fan 27 may be made close to being parallel with each other, such that air can be taken in widely from the third surface 213 side. According to this configuration, the third surface 213 may be cooled efficiently. The arrangement of the secondary transfer inner roller 23 and the shape of the frame 26 are not limited thereto, and they may be changed arbitrarily.

Figure 2:
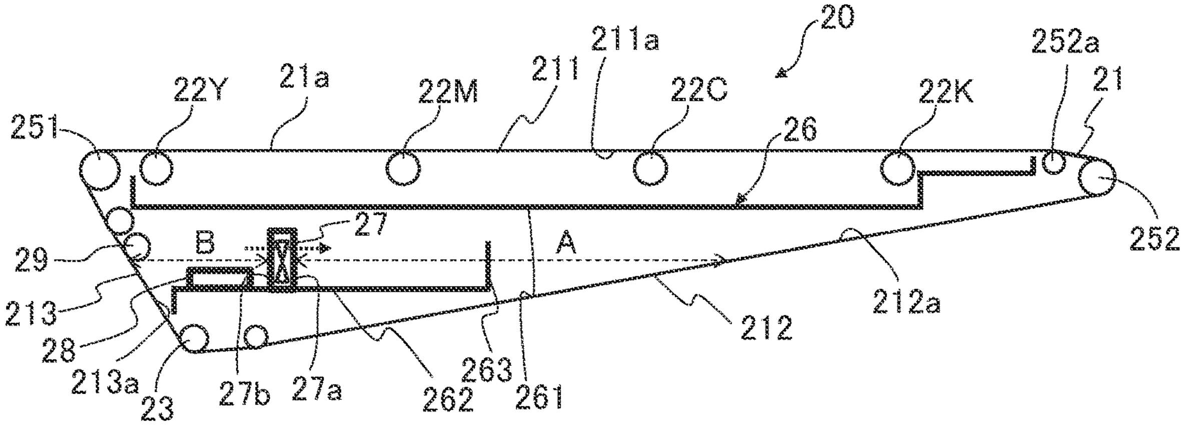
FIG. 2 is a schematic cross-sectional view of an intermediate transfer apparatus according to the first embodiment.

The shape of the frame 26 and the attachment position of the cooling fan 27 illustrated in FIG. 2 are merely an example, and the shape of the frame 26 or the attachment position of the cooling fan 27 may be changed arbitrarily. For example, the first connecting portion 261 may be arranged to approximately orthogonally intersect the third surface 213, and the cooling fan 27 may be attached to the first connecting portion 261, such that the air discharge port 27*a* of the cooling fan 27 is opposed to an inner circumference surface 211*a* of the first surface 211. In short, the air intake port 27*b* of the cooling fan 27 should be arranged in a vicinity of the inner circumference surface 213*a* of the third surface 213, and a distance between the inner circumference surface of the intermediate transfer belt 21 opposed to the air discharge port 27*a* and the air discharge port 27*a* should be set equal to or longer than the distance between the air intake port 27*b* and the inner circumference surface 213*a*.

Second Embodiment

A second embodiment will be described with reference to FIG. 3. In the first embodiment described above, an axial fan was used as the cooling fan 27, but a cooling fan 270 according to the present embodiment is a sirocco fan. Further, along therewith, a shape of a frame 26A supporting the stretch roller is changed. The other configurations and operations are similar to the first embodiment described above, such that configurations similar to the first embodiment are denoted with the same reference numbers and descriptions and illustrations thereof are omitted or simplified, and the differences from the first embodiment will mainly be described below.

In an intermediate transfer apparatus 20A according to the present embodiment, the frame 26A includes, similar to the first embodiment, one pair of side plates rotatably supporting a plurality of stretch rollers including the first roller 251, the second roller 252, and the secondary transfer inner roller 23, and a connecting portion 264 that connects the pair of side plates. The connecting portion 264 includes a first frame portion 264*a*, a second frame portion 264*b*, and a third frame portion 264*c*. The first frame portion 264*a* is disposed to extend in the rotational axis direction of the respective stretch rollers, and arranged to extend approximately parallel to the first direction below the primary transfer roller 22Y and the primary transfer roller 22M. The second frame portion 264*b* is approximately parallel with the first frame portion 264*a* and arranged lower than the first frame portion 264*a*. The second frame portion 264*b* is arranged below the primary transfer roller 22C and the primary transfer roller 22K. The third frame portion 264*c* is arranged above the second frame portion 264*b* and coplanar with the first frame portion 264*a*. The third frame portion 264*c* is arranged below the roller 252*a*.

The first frame portion 264*a*, the second frame portion 264*b*, and the third frame portion 264*c* are arranged continuously through a vertical plate portion 264*d*. Thereby, a cross sectional plane that orthogonally intersects the rotational axis direction of the respective stretch rollers of the frame 26A has a recessed shape as illustrated in FIG. 3. The shape of the frame 26A illustrated in FIG. 3 is merely an example, and for example, the shape can be different from the configuration illustrated in FIG. 3, such as a configuration where the first frame portion 264*a* is discontinuous.

Further, the bent portion 263 is provided at an end portion of the frame 26A to enhance strength. Further according to the present embodiment, the pair of side plates of the frame 26A and the intermediate transfer belt 21 are not in contact with each other, and the interior spaces surrounded by the pair of side plates and the intermediate transfer belt 21 are communicated with the exterior space of the intermediate transfer belt 21.

According to the present embodiment, the cooling fan 270 is attached below the second frame portion 264*b* to cool the third surface 213 of the intermediate transfer belt 21 from the inner side. An opening portion communicated with an air discharge port 270*a* of the cooling fan 270 is formed on the second frame portion 264*b*, and air blown out through the air discharge port 270*a* is designed to flow above the second frame portion 264*b*. The cooling fan 270 may be attached to a different position within the frame 26A, such as to the first frame portion 264*a*.

The cooling fan 270 is a sirocco fan, and it is arranged such that, regarding the direction of airflow generated by the cooling fan 270, a distance C between an inner circumference surface 211*a* of the intermediate transfer belt 21 opposed to the air discharge port 270*a* of the cooling fan 270 and the air discharge port 270*a* is equal to or greater than a distance D between an inner circumference surface 213*a* of the intermediate transfer belt 21 opposed to an air intake port 270*b* of the cooling fan 270 and the air intake port 270*b* ($C \geq D$).

Specifically, according to the present embodiment, the cooling fan 270 is arranged such that, regarding the direction of airflow, the distance C between the inner circumference surface 211*a* of the intermediate transfer belt 21 opposed to the air discharge port 270*a* and the air discharge port 270*a* is longer than the distance D between the inner circumference surface 213*a* of the intermediate transfer belt 21 opposed to the air intake port 270*b* and the air intake port 270*b* ($C > D$).

The inner circumference surface 211*a* of the intermediate transfer belt 21 opposed to the air discharge port 27*a* is the inner circumference surface of the intermediate transfer belt 21 whose outer circumference surface serves as the first surface 211, and the inner circumference surface 213*a* of the intermediate transfer belt 21 opposed to the air intake port 27*b* is the inner circumference surface of the intermediate transfer belt 21 whose outer circumference surface serves as the third surface 213. Further according to the present embodiment, the cooling fan 270 is a sirocco fan, such that the direction of airflow taken in through the air intake port 270*b* differs from the direction of airflow that is discharged through the air discharge port 270*a*. Therefore, unlike the first embodiment, the direction of airflow discharged through the air discharge port 270*a* is blown toward the inner side of the first surface 211 of the intermediate transfer belt 21.

The distance between the air discharge port 270*a* and the inner circumference surface 211*a* is set to be a distance between a center position of an opening surface of the cooling fan 270 on which the air discharge port 270*a* is formed, i.e., air discharge surface, and a position where a virtual line extended downstream in the direction of airflow, i.e., air discharge direction, on the air discharged side of the cooling fan 270 from the center position intersects the inner circumference surface 211*a*. The distance between the air intake port 270*b* and the inner circumference surface 213*a* is set to be a distance between a center position of an opening surface of the cooling fan 270 on which the air intake port 270*b* is formed, i.e., air intake surface, and a position where a line extended along the rotational axis direction of the cooling fan 270 from the center position intersects the inner circumference surface 213*a*. In the case of a sirocco fan, the direction of airflow on the air discharge side is defined as a normal direction of an opening surface on which the air discharge port of the cooling fan 270 is formed.

Even according to the present embodiment, the cooling fan 270 is arranged close to the inner circumference surface side of the third surface 213 to take in air from the inner circumference surface side of the third surface 213 and to discharge air to a wider space within the intermediate transfer apparatus 20A.

Further, since the space surrounded by the air discharge port 270*a* of the cooling fan 270, the first frame portion 264*a*, the second frame portion 264*b*, the third frame portion 264*c*, the vertical plate portion 264*d*, and the inner circumference surface 211*a* of the first surface 211 is greater than the space surrounded by the air intake port 270*b* of the cooling fan 270, the second frame portion 264*b*, and the inner circumference surface 213*a* of the third surface 213, the heat of the third surface 213 which is relatively high may be flown into a wider space by the cooling fan 270, according to which the interior of the intermediate transfer apparatus 20A may be ventilated efficiently. Thereby, the temperature gradient within the intermediate transfer apparatus 20A may be leveled, and the overheating of the intermediate transfer belt 21, the photosensitive drums 11Y to 11K, and the developing units 14Y to 14K may be prevented.

Figure 3:
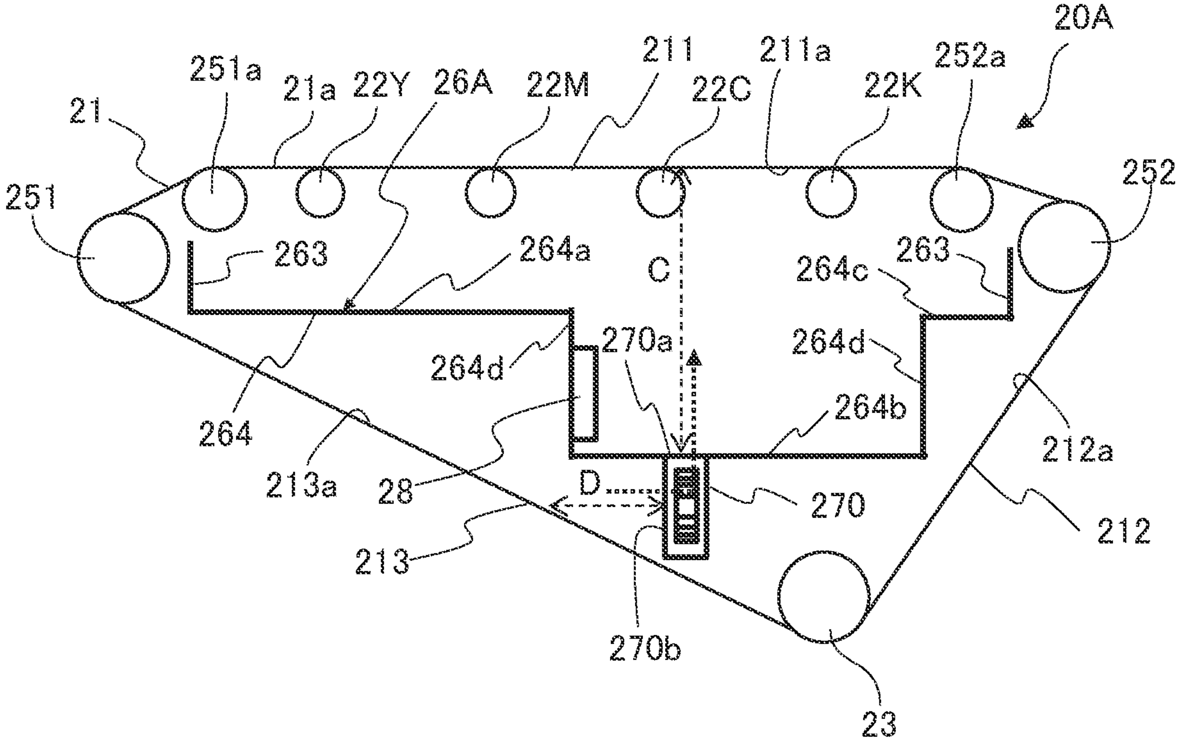
FIG. 3 is a schematic cross-sectional view of an intermediate transfer apparatus according to a second embodiment.

According further to the present embodiment, the secondary transfer inner roller 23 is arranged downstream in the direction of rotation of the intermediate transfer belt 21 with respect to the center position of the intermediate transfer belt 21 in the first direction, that is, in a vicinity of the area opposed to the primary transfer roller 22K in FIG. 3. Thereby, the space below the first frame portion 264*a* and the third frame portion 264*c* is designed such that the downstream side in the direction of rotation of the intermediate transfer belt 21 in the first direction is greater than the upstream side thereof. According to this configuration, the second frame portion 264*b* may easily be arranged close to the downstream side in the direction of rotation of the intermediate transfer belt 21 in the first direction with respect to the first frame portion 264*a*, and a wide space may be ensured between the inner circumference surface 213*a* of the third surface 213 and the air intake port 270*b* of the cooling fan 270, such that the cooling fan 270 may easily be arranged. However, the arrangement of the secondary transfer inner roller 23 and the shape of the frame 26A are not limited thereto, and they may be changed arbitrarily.

Further, for example, if a heating element 28 such as a high-voltage substrate for applying a secondary transfer voltage or a resistor electrically connected to the high-voltage substrate is arranged within the intermediate transfer apparatus 20A, it is preferably arranged in a vicinity of the air discharge port 270*a* of the cooling fan 270, such as on the vertical plate portion 264*d*, so that the air from the cooling fan 270 is blown thereto. Thereby, the heating element 28 may be cooled efficiently. Further, a cooling duct not shown to be connected with the cooling fan 270 may be disposed to send air in a concentrated manner to the heating element 28.

As described, even according to the present invention, similar to the first embodiment, the rising of temperature of the intermediate transfer belt 21 may be suppressed without causing scattering of toner on the surface of the intermediate transfer belt 21. That is, since the cooling fan 270 is arranged on the inner side of the intermediate transfer belt 21, scattering of toner on the outer circumference surface of the intermediate transfer belt 21 by the airflow generated by the cooling fan 270 may be suppressed. Moreover, since the distance C between the air discharge port 270*a* of the cooling fan 270 and the inner circumference surface 211*a* of the intermediate transfer belt 21 is set equal to or longer than the distance D between the air intake port 270*b* and the inner circumference surface 213*a*, or preferably, the distance C is set longer than the distance D, the intermediate transfer belt 21 may be cooled efficiently.

Third Embodiment

A third embodiment will be described with reference to FIG. 4. In the first and second embodiments described above, the air intake port of the cooling fan was disposed to be opposed to the inner circumference surface 213*a* of the third surface 213, but in the present embodiment, the air discharge port of the cooling fan is disposed to be opposed to the inner circumference surface 213*a* of the third surface 213. Further, according to the present embodiment, an axial fan similar to the first embodiment is used as the cooling fan 27. The other configurations and operations are similar to the first embodiment described above, such that configurations similar to the first embodiment are denoted with the same reference numbers and descriptions and illustrations thereof are omitted or simplified, and the differences from the first embodiment will mainly be described below.

In an intermediate transfer apparatus 20B according to the present embodiment, the frame 26B includes, similar to the first embodiment, one pair of side plates rotatably supporting a plurality of stretch rollers including the first roller 251, the second roller 252, and the secondary transfer inner roller 23, and a first connecting portion 261A and a second connecting portion 262A that connect the pair of side plates. The first connecting portion 261A is arranged to extend approximately parallel to the first surface 211. The second connecting portion 262A is arranged approximately parallel to the first connecting portion 261A below the first connecting portion 261A. The shape of the frame 26B illustrated in FIG. 4 is merely an example, and the configuration can be different from FIG. 4, such as the first connecting portion 261A being discontinuous.

Further, the bent portion 263 is formed on the first connecting portion 261A to enhance strength. The bent portion 263 is configured such that the space between the first connecting portion 261A and the second connecting portion 262A is communicated with the space between the first connecting portion 261A and the intermediate transfer belt 21 in order to prevent heat from being accumulated in one portion. For example, similar to the first embodiment, a configuration may be adopted where an opening or a louver is formed on the bent portion 263. Further, the pair of side plates of the frame 26B and the intermediate transfer belt 21 are not in contact with each other, and the interior spaces surrounded by the pair of side plates and the intermediate transfer belt 21 are communicated with the exterior space of the intermediate transfer belt 21.

According to the present embodiment, the cooling fan 27 is attached to the second connecting portion 262A to cool the third surface 213 from the inner side. The cooling fan 27 may be attached to a different position within the frame 26B, such as to the first connecting portion 261A. The cooling fan 27 is an axial fan, and it is arranged close to the inner circumference surface 212*a* side of the second surface 212 to take in air from the inner side of the second surface 212 and blow out air toward the inner circumference surface 213*a* of the third surface 213. The inner circumference surface 212*a* of the intermediate transfer belt 21 opposed to the air intake port 27*b* is arranged downstream of a primary transfer portion 220K and upstream of the secondary transfer portion 230 with respect to the direction of rotation of the intermediate transfer belt 21.

The cooling fan 27 is arranged such that, regarding the direction of airflow generated by the cooling fan 27, that is, rotational axis direction of the cooling fan 27, a distance E between an inner circumference surface 213*a* of the intermediate transfer belt 21 opposed to the air discharge port 27*a* of the cooling fan 27 and the air discharge port 27*a* is equal to or greater than a distance F between an inner circumference surface 212*a* of the intermediate transfer belt 21 opposed to an air intake port 27*b* of the cooling fan 27 and the air intake port 27*b* (E≥F).

Specifically, according to the present embodiment, the cooling fan 27 is arranged such that, regarding the direction of airflow, the distance E between the inner circumference surface 213*a* of the intermediate transfer belt 21 opposed to the air discharge port 27*a* and the air discharge port 27*a* is longer than the distance F between the inner circumference surface 212*a* of the intermediate transfer belt 21 opposed to the air intake port 27*b* and the air intake port 27*b* (E>F).

According to the present embodiment, the cooling fan 27 is arranged close to the inner circumference surface side of the second surface 212, to take in air from the inner circumference surface side of the second surface 212 and to discharge air to a wider space within the intermediate transfer apparatus 20A.

Further, since the space surrounded by the air discharge port 27*a* of the cooling fan 27, the first connecting portion 261A, the second connecting portion 262A, and the inner circumference surface 213*a* of the third surface 213 is greater than the space surrounded by the air intake port 27*b* of the cooling fan 27, the first connecting portion 261A, the second connecting portion 262A, and the inner circumference surface 212*a* of the second surface 212, the air near the second surface 212 which is relatively of low temperature may be blown efficiently toward the third surface 213 which has a relatively high temperature by the cooling fan 27, according to which the interior of the intermediate transfer apparatus 20B may be ventilated efficiently. Further, in a case where the fixing unit 5 is arranged relatively close to the intermediate transfer apparatus 20B, that is, downstream of the secondary transfer portion 230, the air warmed by the fixing unit 5 will not be taken into the intermediate transfer apparatus 20B, such that the intermediate transfer belt may be cooled even more efficiently. Thereby, the temperature gradient within the intermediate transfer apparatus 20B may be leveled, and the overheating of the intermediate transfer belt 21, the photosensitive drums 11Y to 11K, and the developing units 14Y to 14K may be prevented.

Figure 4:
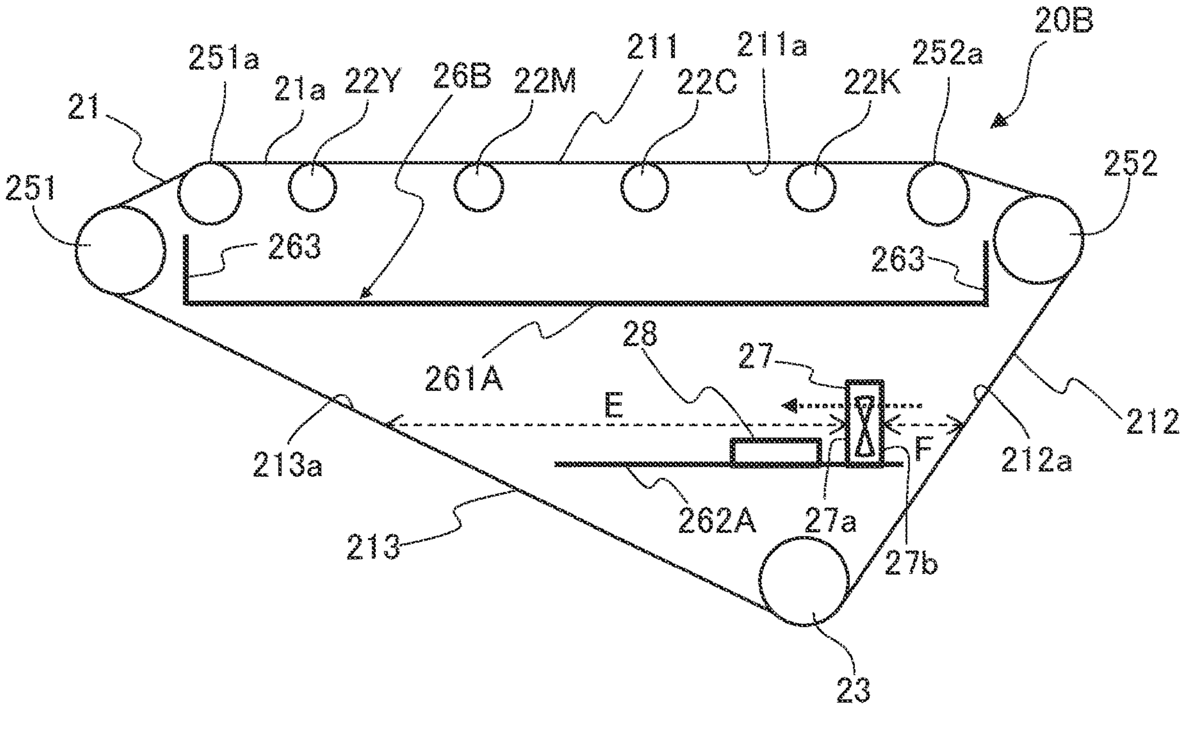
FIG. 4 is a schematic cross-sectional view of an intermediate transfer apparatus according to a third embodiment.

According further to the present embodiment, the secondary transfer inner roller 23 is arranged downstream in the direction of rotation of the intermediate transfer belt 21 with respect to the center position of the intermediate transfer belt 21 in the first direction, that is, in a vicinity of the area opposed to the primary transfer roller 22K in FIG. 4. Thereby, the space below the first connecting portion 261A is designed such that the downstream side in the direction of rotation of the intermediate transfer belt 21 in the first direction is greater than the upstream side thereof. According to this configuration, the second connecting portion 262A may easily be arranged close to the downstream side in the direction of rotation of the intermediate transfer belt 21 in the first direction with respect to the first connecting portion 261A, and a long distance E can easily be realized, such that the third surface 213 may be cooled even more efficiently. However, the arrangement of the secondary transfer inner roller 23 and the shape of the frame 26B are not limited thereto, and they may be changed arbitrarily.

Further, for example, if a heating element 28 such as a high-voltage substrate for applying a secondary transfer voltage or a resistor electrically connected to the high-voltage substrate is arranged within the intermediate transfer apparatus 20B, it is preferably arranged in a vicinity of the air discharge port 27*a* of the cooling fan 27, such that the heating element 28 may be cooled efficiently. Further, a cooling duct not shown to be connected with the cooling fan 27 may be disposed to send air in a concentrated manner to the heating element 28.

Further according to the present embodiment, similar to the second embodiment, the cooling fan may be a sirocco fan. In that case, for example, the cooling fan is attached to the first connecting portion 261A, the air intake port 27*b* is opposed to the inner circumference surface 211*a* of the first surface 211, and the air discharge port 27*a* is opposed to the inner circumference surface 213*a* of the third surface 213.

As described, even according to the present invention, similar to the first embodiment, the rising of temperature of the intermediate transfer belt 21 may be suppressed without causing scattering of toner on the surface of the intermediate transfer belt 21. That is, since the cooling fan 27 is arranged on the inner side of the intermediate transfer belt 21, scattering of toner on the outer circumference surface of the intermediate transfer belt 21 by the airflow generated by the cooling fan 27 may be suppressed. Moreover, since the distance E between the air discharge port 27*a* of the cooling fan 27 and the inner circumference surface 213*a* of the intermediate transfer belt 21 is set equal to or longer than the distance F between the air intake port 27*b* and the inner circumference surface 212*a*, or preferably, the distance E is set longer than the distance F, the intermediate transfer belt 21 may be cooled efficiently.

Fourth Embodiment

Figure 5:
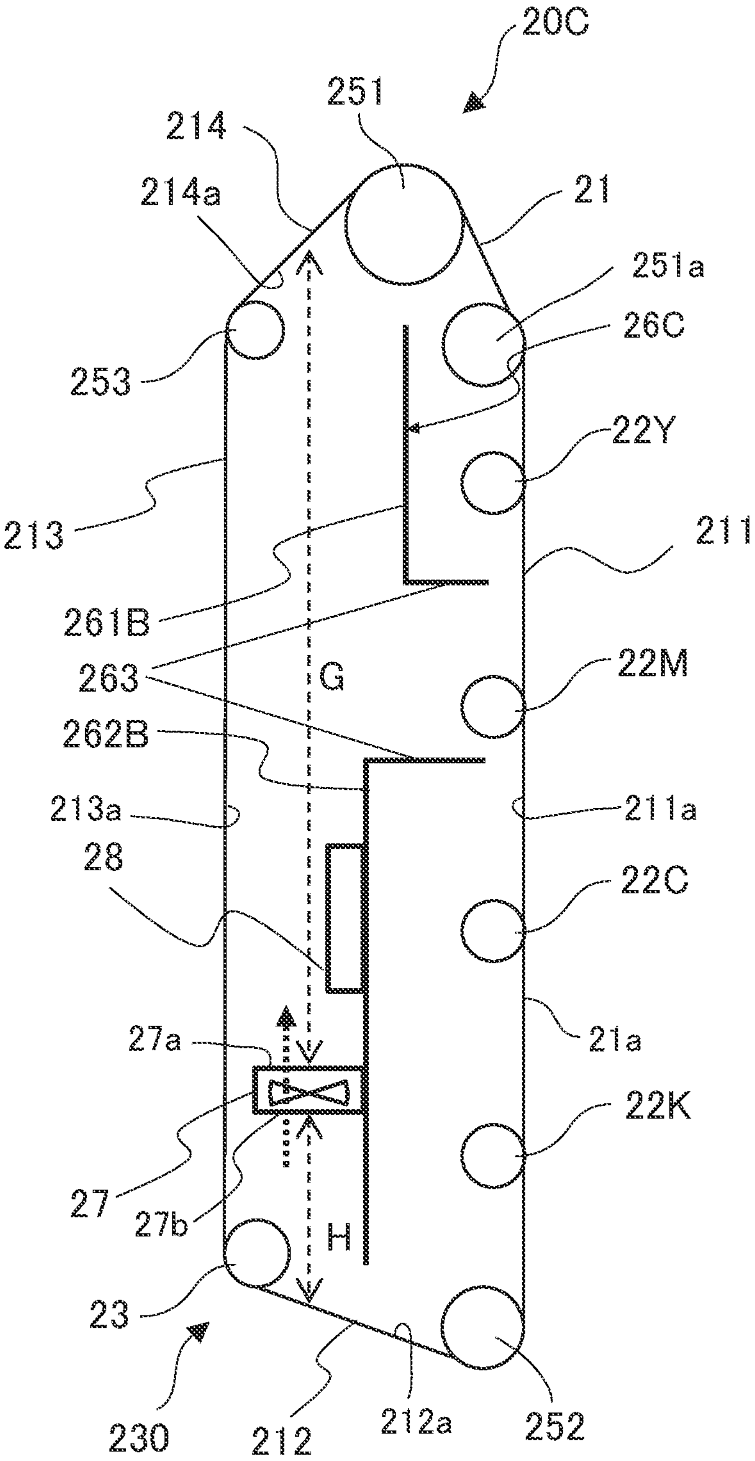
FIG. 5 is a schematic cross-sectional view of an intermediate transfer apparatus according to a fourth embodiment.

A fourth embodiment will be described with reference to FIG. 5. In the first to third embodiments described above, a configuration was described of a case where the intermediate transfer apparatus is arranged such that the first surface 211 of the intermediate transfer belt 21 is disposed approximately horizontally, but in the present embodiment, a configuration is adopted in which the intermediate transfer apparatus is arranged such that the first surface 211 of the intermediate transfer belt 21 is disposed approximately vertically. Further, according to the present embodiment, an axial fan similar to the first embodiment is used as the cooling fan 27. The other configurations and operations are similar to the first embodiment described above, such that configurations similar to the first embodiment are denoted with the same reference numbers and descriptions and illustrations thereof are omitted or simplified, and the differences from the first embodiment will mainly be described below.

According to the present embodiment, the image forming apparatus adopts a configuration in which the photosensitive drums 11Y to 11K are aligned approximately in the vertical direction, and along therewith, the first direction in which the primary transfer rollers 22Y to 22K are aligned is also approximately the vertical direction, i.e., gravity direction. In a case where an apparatus for performing various processes to the recording material S, such as cutting and folding, after a full-color image has been formed on the recording material S is connected to the image forming apparatus, the connecting direction is normally the right-left direction, that is, horizontal direction, and the conveyance direction of the recording material S is also preferably the right-left direction in the drawing.

As described above, an intermediate transfer apparatus 20C according to the present embodiment is set such that the first direction is the gravity direction, and in a state where the recording material S is conveyed in the right-left direction, the position of the secondary transfer portion 230 is set to be at a lower portion of the intermediate transfer apparatus 20C, such that the recording material S may be conveyed in the right-left direction without being bent greatly. That is, the position of the secondary transfer inner roller 23 for forming the secondary transfer portion 230 is set to be at a lower portion of the intermediate transfer apparatus 20C. For example, the recording material S enters the secondary transfer portion 230 from a right obliquely downward direction of FIG. 5 of the secondary transfer portion 230, and after passing through the secondary transfer portion 230, the recording material S is conveyed leftward in FIG. 5 in an approximately horizontal direction. The arrangement of the secondary transfer inner roller 23 and the shape of the frame 26C are not limited thereto, and they may be changed arbitrarily.

A third roller 253 that causes the surface downstream of the secondary transfer inner roller 23 in the direction of rotation of the intermediate transfer belt 21 to be approximately parallel to the first surface 211 is disposed between the secondary transfer inner roller 23 and the first roller 251. The third roller 253 is also a stretch roller that stretches the intermediate transfer belt 21. According to the present embodiment, in the direction of rotation of the intermediate transfer belt 21, the outer circumference surface from the area downstream of the secondary transfer inner roller 23 to the area upstream of the third roller 253 is referred to as the third surface 213, and the outer circumference surface from the area downstream of the third roller 253 to the area upstream of the first roller 251 is referred to as a fourth surface 214.

The frame 26C includes one pair of side plates that support a plurality of stretch rollers including the first roller 251, the second roller 252, the third roller 253, and the secondary transfer inner roller 23 rotatably, and a first connecting portion 261B and a second connecting portion 262B that connect the pair of side plates. The first connecting portion 261B and the second connecting portion 262B are arranged approximately in parallel with the first surface 211 and discontinuously. Further, the second connecting portion 262B is arranged closer to the third surface 213 compared to the first connecting portion 261B. The shape of the frame 26C illustrated in FIG. 5 is merely an example, and alternatively, the first connecting portion 261B and the second connecting portion 262B may also be formed successively.

The first connecting portion 261B and the second connecting portion 262B are each provided with the bent portion 263 to enhance strength. Further, the pair of side plates of the frame 26C and the intermediate transfer belt 21 are not in contact with each other, and the interior spaces surrounded by each of the pair of side plates and the intermediate transfer belt 21 are each communicated with the exterior space of the intermediate transfer belt 21.

As described above, heat is conveyed to the secondary transfer portion 230 by the recording material S having passed the fixing unit 5, such that the secondary transfer portion 230 may be heated to a relatively high temperature. In the present embodiment, in order to cool the vicinity of the secondary transfer inner roller 23, the cooling fan 27 is attached to the second connecting portion 262B. The cooling fan 27 may be attached to a different position within the frame 26C. The cooling fan 27 is an axial fan, and it is arranged close to the secondary transfer inner roller 23 and the inner circumference surface 212*a* side of the second surface 212 so as to take in air from the vicinity of the secondary transfer inner roller 23 and the inner circumference surface 212*a* and to blow out air toward an inner circumference surface 214*a* of the fourth surface 214.

The cooling fan 27 is arranged such that, regarding the direction of airflow generated by the cooling fan 27, that is, the rotational axis direction of the cooling fan 27, a distance G between an inner circumference surface 214*a* of the intermediate transfer belt 21 opposed to the air discharge port 27*a* of the cooling fan 27 and the air discharge port 27*a* is equal to or greater than a distance H between an inner circumference surface 212*a* of the intermediate transfer belt 21 opposed to an air intake port 27*b* of the cooling fan 27 and the air intake port 27*b* (G≥H).

Specifically, according to the present embodiment, the cooling fan 27 is arranged such that, regarding the direction of airflow, the distance G between the inner circumference surface 214*a* of the intermediate transfer belt 21 opposed to the air discharge port 27*a* and the air discharge port 27*a* is longer than the distance H between the inner circumference surface 212*a* of the intermediate transfer belt 21 opposed to the air intake port 27*b* and the air intake port 27*b* (G>H).

Even according to the present embodiment, the cooling fan 27 is arranged close to the inner circumference surface side of the second surface 212 to take in air from the inner circumference surface side of the second surface 212 and to discharge air to a wider space within the intermediate transfer apparatus 20C.

Further, since the space surrounded by the air discharge port 27*a* of the cooling fan 27, the first connecting portion 261B, the second connecting portion 262B, the inner circumference surface 213*a* of the third surface 213, and the inner circumference surface 214*a* of the fourth surface 214 is greater than the space surrounded by the air intake port 27*b* of the cooling fan 27, the second connecting portion 262B, the inner circumference surface 212*a* of the second surface 212, and the inner circumference surface 213*a* of the third surface 213, the air near the second surface 212 which is of relatively low temperature may be blown toward a wider space by the cooling fan 27, according to which the interior of the intermediate transfer apparatus 20C may be ventilated efficiently. Thereby, the temperature gradient within the intermediate transfer apparatus 20C may be leveled, and the overheating of the intermediate transfer belt 21, the photosensitive drums 11Y to 11K, and the developing units 14Y to 14K may be prevented.

Further, for example, if a heating element 28 such as a high-voltage substrate for applying a secondary transfer voltage or a resistor electrically connected to the high-voltage substrate is arranged within the intermediate transfer apparatus 20C, it is preferably arranged in a vicinity of the air discharge port 27*a* of the cooling fan 27, or in a vicinity of the air intake port 27*b* thereof, to thereby cool the heating element 28. Further, a cooling duct not shown to be connected with the cooling fan 27 may be disposed to send air in a concentrated manner to the heating element 28.

As described, even according to the present invention, similar to the first embodiment, the rising of temperature of the intermediate transfer belt 21 may be suppressed without causing scattering of toner on the surface of the intermediate transfer belt 21. That is, since the cooling fan 27 is arranged on the inner side of the intermediate transfer belt 21, scattering of toner on the outer circumference surface of the intermediate transfer belt 21 by the airflow generated by the cooling fan 27 may be suppressed. Moreover, since the distance G between the air discharge port 27*a* of the cooling fan 27 and the inner circumference surface 214*a* of the intermediate transfer belt 21 is set equal to or longer than the distance H between the air intake port 27*b* and the inner circumference surface 212*a*, or preferably, the distance G is set longer than the distance H, the intermediate transfer belt 21 may be cooled efficiently.

Fifth Embodiment

A fifth embodiment will be described with reference to FIG. 6. In the fourth embodiment described above, an axial fan was used as the cooling fan 27, but a cooling fan 270 according to the present embodiment is a sirocco fan. Further, along therewith, a shape of a frame 26D supporting the stretch roller is changed. The other configurations and operations are similar to the fourth embodiment described above, such that configurations similar to the fourth embodiment are denoted with the same reference numbers and descriptions and illustrations thereof are omitted or simplified, and the differences from the fourth embodiment will mainly be described below.

In an intermediate transfer apparatus 20D according to the present embodiment, the frame 26D includes one pair of side plates rotatably supporting a plurality of stretch rollers including the first roller 251, the second roller 252, the third roller 253, and the secondary transfer inner roller 23, a first connecting portion 265 and a second connecting portion 266 that connect the pair of side plates. The first connecting portion 265 includes a first frame portion 265*a*, a second frame portion 265*b*, and a third frame portion 265*c* that are arranged discontinuously and parallel to the first surface 211. The second connecting portion 266 is arranged approximately parallel to the first connecting portion 265 and arranged closer to the third surface 213 compared to the first connecting portion 265. Further, the shape of the frame 26D illustrated in FIG. 6 is merely an example, and alternatively, a configuration that differs from FIG. 6 may be adopted, such as having the first connecting portion 265 formed successively, or not having the second connecting portion 266.

Further, the bent portion 263 is provided at end portions of the first frame portion 265*a*, the second frame portion 265*b*, and the third frame portion 265*c* to enhance strength. Further, the space between the first connecting portion 265 and the second connecting portion 266 is designed to be communicated with the space between the first connecting portion 265 and the intermediate transfer belt 21. Further, even according to the present embodiment, the pair of side plates of the frame 26D and the intermediate transfer belt 21 are not in contact with each other, and the interior spaces surrounded by the pair of side plates and the intermediate transfer belt 21 are communicated with the exterior space of the intermediate transfer belt 21.

According to the present embodiment, the cooling fan 270 is attached to the second connecting portion 266 to cool the third surface 213 of the intermediate transfer belt 21 from the inner side. An opening portion communicated with the air intake port 270*b* of the cooling fan 270 is formed on the second connecting portion 266, and air may be taken in through the opening portion from the air intake port 270*b*. The cooling fan 270 may be attached to a different position within the frame 26D, such as to the first connecting portion 265.

The cooling fan 270 is a sirocco fan, and it is arranged close to the inner circumference surface 213*a* side of the third surface 213 to take in air from the area close to the third surface 213 and to discharge air toward the inner circumference surface 214*a* of the fourth surface 214.

According to the present embodiment, the cooling fan 270 is arranged such that, regarding the direction of airflow generated by the cooling fan 270, a distance J between the inner circumference surface 214*a* of the intermediate transfer belt 21 opposed to the air discharge port 270*a* of the cooling fan 270 and the air discharge port 270*a* is equal to or greater than a distance K between the inner circumference surface 213*a* of the intermediate transfer belt 21 opposed to the air intake port 270*b* of the cooling fan 270 and the air intake port 270*b* (J≥K).

Specifically, according to the present embodiment, the cooling fan 270 is arranged such that, regarding the direction of airflow, the distance J between the inner circumference surface 214*a* of the intermediate transfer belt 21 opposed to the air discharge port 270*a* and the air discharge port 270*a* is longer than the distance K between the inner circumference surface 213*a* of the intermediate transfer belt 21 opposed to the air intake port 270*b* and the air intake port 270*b* (J>K). The relationship of distances between the air discharge port 270*a* and the air intake port 270*b* of the cooling fan 270 and the inner circumference surface of the intermediate transfer belt 21 are similar to the second embodiment.

Even according to the present embodiment, the cooling fan 270 is arranged close to the inner circumference surface side of the third surface 213 to take in air from the inner circumference surface side of the third surface 213 and to discharge air to a wider space within the intermediate transfer apparatus 20D.

Further, since the space surrounded by the air discharge port 270*a* of the cooling fan 270, the first connecting portion 265, the second connecting portion 266, the inner circumference surface 213*a* of the third surface 213, and the inner circumference surface 214*a* of the fourth surface 214 is greater than the space surrounded by the air intake port 270*b* of the cooling fan 270, the second connecting portion 266, and the inner circumference surface 213*a* of the third surface 213, the air near the third surface 213 which is of relatively high temperature may be flown into a wider space by the cooling fan 270, according to which the interior of the intermediate transfer apparatus 20D may be ventilated efficiently. Thereby, the temperature gradient within the intermediate transfer apparatus 20D may be leveled, and the overheating of the intermediate transfer belt 21, the photosensitive drums 11Y to 11K, and the developing units 14Y to 14K may be prevented.

Figure 6:
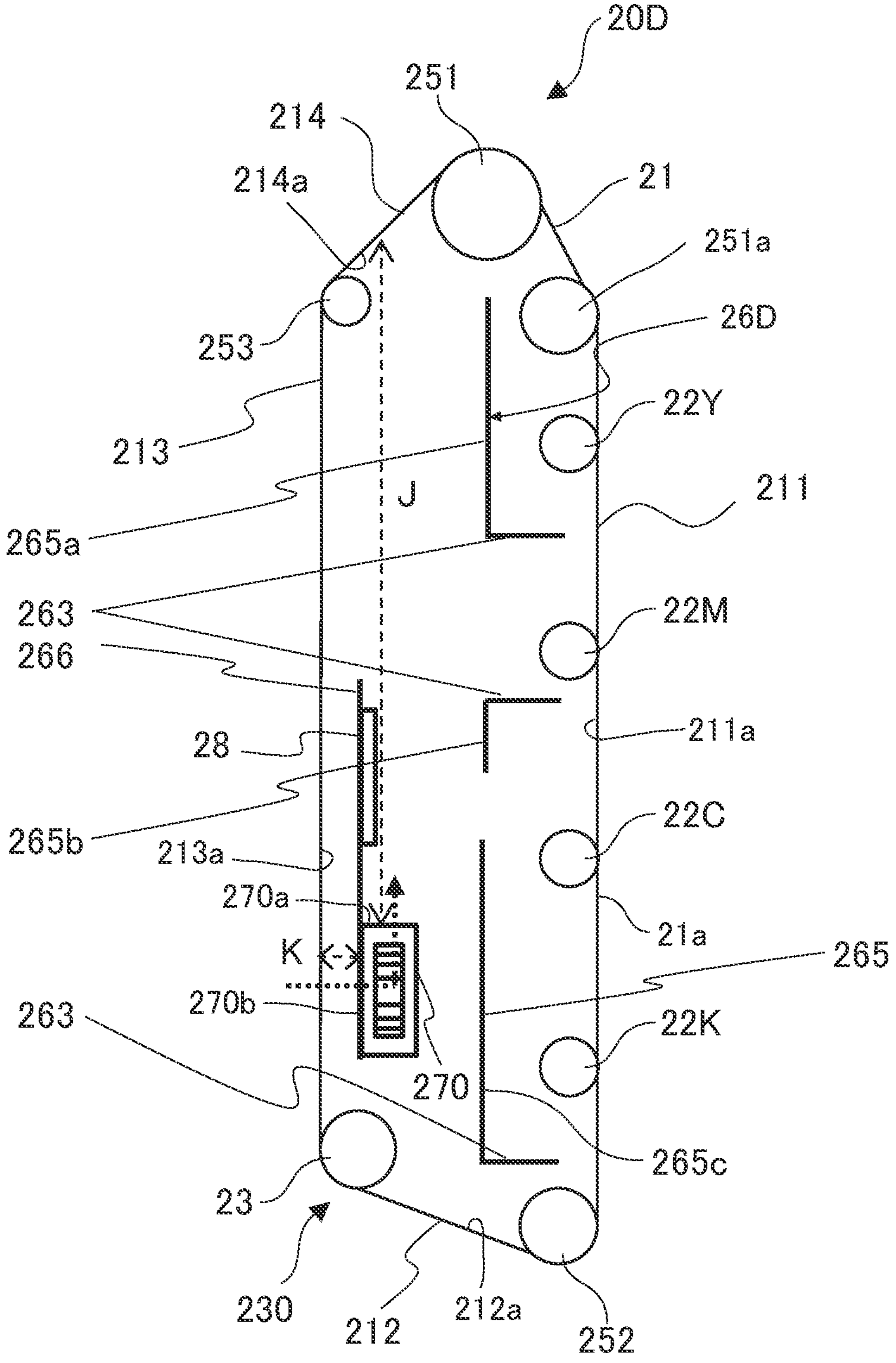
FIG. 6 is a schematic cross-sectional view of an intermediate transfer apparatus according to a fifth embodiment.

In FIG. 6, the secondary transfer inner roller 23 is arranged in the vicinity of a portion opposed to an area between the primary transfer roller 22K and the second roller 252, but the arrangement of the secondary transfer inner roller 23 and the shape of the frame 26D are not limited thereto.

Further, for example, if a heating element 28 such as a high-voltage substrate for applying a secondary transfer voltage or a resistor electrically connected to the high-voltage substrate is arranged within the intermediate transfer apparatus 20D, it is preferably arranged in a vicinity of the air discharge port 270*a* of the cooling fan 270 so that the air from the cooling fan 270 is blown thereto. Thereby, the heating element 28 may be cooled efficiently. Further, a cooling duct not shown to be connected with the cooling fan 270 may be disposed to send air in a concentrated manner to the heating element 28.

As described, even according to the present invention, similar to the first embodiment, the rising of temperature of the intermediate transfer belt 21 may be suppressed without causing scattering of toner on the surface of the intermediate transfer belt 21. That is, since the cooling fan 270 is arranged on the inner side of the intermediate transfer belt 21, scattering of toner on the outer circumference surface of the intermediate transfer belt 21 by the airflow generated by the cooling fan 270 may be suppressed. Moreover, since the distance J between the air discharge port 270*a* of the cooling fan 270 and the inner circumference surface 214*a* of the intermediate transfer belt 21 is set equal to or longer than the distance K between the air intake port 270*b* and the inner circumference surface 213*a*, or preferably, the distance J is set longer than the distance K, the intermediate transfer belt 21 may be cooled efficiently.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-182675, filed Nov. 15, 2022, which is hereby incorporated by reference herein in its entirety.

What is claimed is:

1. An image forming apparatus comprising:

a rotatable endless belt configured to bear a toner image on an outer circumference surface of the belt;

a plurality of stretching members configured to stretch the belt;

a frame configured to support the stretching members;

a transfer member to which a transfer voltage is applied and that is configured to transfer the toner image borne on the belt to a recording material;

a voltage applied portion arranged on an inner side of the belt and configured to receive application of a voltage to generate the transfer voltage; and a fan supported on the frame, arranged on the inner side of the belt, and configured to cool the voltage applied portion, wherein a distance between the fan and an area of the belt opposed to the fan at a downstream side in an air discharge direction of the fan is a first distance, wherein a distance between the fan and an area of the belt opposed to the fan at an upstream side in an air intake direction of the fan is a second distance, and wherein the first distance is equal to or greater than the second distance.

2. The image forming apparatus according to claim 1, wherein the fan is an axial fan, the first distance is a distance from a point of intersection where a rotational axis of the fan and the belt intersect to an air discharge port of the fan at an air discharge side of the fan, and the second distance is a distance from a point of intersection where the rotational axis of the fan and the belt intersect to an air intake port of the fan at an air intake side of the fan.

3. The image forming apparatus according to claim 1, wherein the fan is a sirocco fan, the first distance is a distance from a point of intersection where a virtual line extended along an air discharge direction of the fan from an air discharge port of the fan and the belt intersect to the air discharge port, and the second distance is a distance from a point of intersection where a rotational axis of the fan and the belt intersect to an air intake port of the fan at an air intake side of the fan.

4. The image forming apparatus according to claim 1, wherein the voltage applied portion is a high-voltage substrate.

5. The image forming apparatus according to claim 1, wherein the voltage applied portion includes a resistor configured to be connected electrically to a high-voltage substrate.

6. The image forming apparatus according to claim 1, wherein the toner image is primarily transferred to the belt at a primary transfer portion, the toner image is secondarily transferred from the belt to the recording material at a secondary transfer portion, and an air intake surface side of the fan is configured to be opposed to an area of the belt downstream of the secondary transfer portion and upstream of the primary transfer portion in a direction of rotation of the belt.

7. The image forming apparatus according to claim 1, wherein the toner image is primarily transferred to the belt at a primary transfer portion, the toner image is secondarily transferred from the belt to the recording material at a secondary transfer portion, and an air discharge surface side of the fan is configured to be opposed to an area of the belt downstream of the primary transfer portion and upstream of the secondary transfer portion in a direction of rotation of the belt.

8. The image forming apparatus according to claim 1, wherein the voltage applied portion is provided on an air intake side of the fan.

9. The image forming apparatus according to claim 1, wherein the voltage applied portion is provided on an air discharge side of the fan, and a distance between an air discharge port of the fan and the voltage applied portion is shorter than a distance between the voltage applied portion and the belt in the air discharge direction of the fan.

* * * * *